(12) United States Patent
Eguchi (10) Patent No.: US 9,804,584 B2
(45) Date of Patent: Oct. 31, 2017

(54) SERVO CONTROL APPARATUS

(71) Applicant: OKUMA Corporation, Niwa-gun, Aichi (JP)

(72) Inventor: Satoshi Eguchi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 14/842,237

(22) Filed: Sep. 1, 2015

(65) Prior Publication Data

US 2016/0062341 A1    Mar. 3, 2016

(30) Foreign Application Priority Data

Sep. 3, 2014  (JP) ................. 2014-179299

(51) Int. Cl.
*G05B 11/01* (2006.01)
*G05B 19/19* (2006.01)

(52) U.S. Cl.
CPC .... *G05B 19/19* (2013.01); *G05B 2219/42005* (2013.01)

(58) Field of Classification Search
CPC ........... G05B 2219/39222; G05B 2219/39336; G05B 2219/39355; G05B 2219/41368; G05B 2219/41373; G05B 2219/41374; G05B 2219/42005

USPC .......................................... 318/560
See application file for complete search history.

(56) References Cited

U.S. PATENT DOCUMENTS

| | | | | |
|---|---|---|---|---|
| 5,723,965 A * | 3/1998 | Yim | ...................... | G05B 19/19 318/432 |
| 5,729,111 A * | 3/1998 | Ogura | ................... | G05D 19/02 318/432 |
| 5,959,422 A * | 9/1999 | Kang | ...................... | G05B 5/01 318/561 |
| 5,994,868 A * | 11/1999 | Takeuchi | ................ | H02P 23/16 318/611 |
| 6,490,120 B1 * | 12/2002 | Burton | ................. | G11B 5/5547 360/78.07 |

FOREIGN PATENT DOCUMENTS

JP         H11024708 A    1/1999

* cited by examiner

*Primary Examiner* — Bickey Dhakal
(74) *Attorney, Agent, or Firm* — Cantor Colburn LLP (57) ABSTRACT

A disturbance suppressing system is incorporated in a servo control apparatus. In the disturbance suppressing system, a component e introduced in an output of a target plant due to a disturbance estimate error is amplified in a disturbance suppressing controller having a frequency characteristic corresponding to a magnitude of a plant error, which is a difference in transfer characteristics between the target plant and the plant model, and the amplified component e is fed back to a control input.

1 Claim, 8 Drawing Sheets

<Prior Art>

FIG. 7

<Prior Art>

FIG. 8

<Prior Art>

FIG. 9

<Prior Art>

FIG. 10

<Prior Art>

FIG. 11

<Prior Art>

FIG. 12

<Prior Art>

SERVO CONTROL APPARATUS

CROSS REFERENCE TO RELATED APPLICATION

The present invention claims priority under 35 U.S.C. §119 to Japanese Application No. 2014-179299 filed on Sep. 3, 2014, the entire content of which is incorporated herein by reference.

TECHNICAL FIELD

The present invention relates to a servo control apparatus, and, in particular, to a velocity control apparatus and a position control apparatus used for controlling axes in a numerically controlled machine.

BACKGROUND ART

Figure 6:
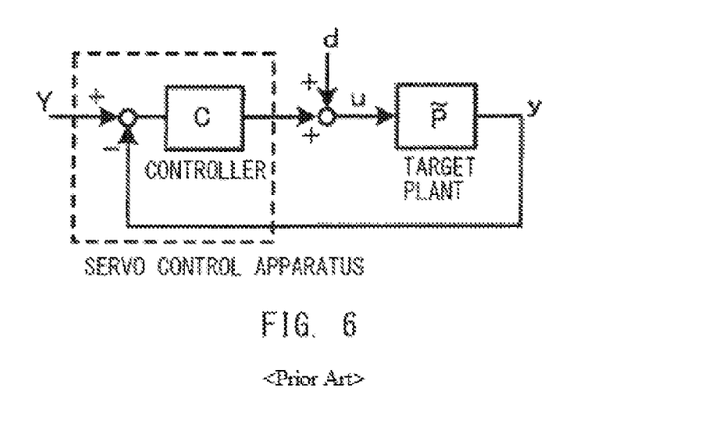
FIG. 6 is a diagram showing a schematic configuration of a typical servo control apparatus.

In general, servo control apparatuses (such as velocity control apparatuses and position control apparatuses) used for controlling axes in numerically controlled machines are required to have good system stability (including a vibration suppressing capability), and high levels of command following performance and disturbance suppressing performance. FIG. 6 shows a general configuration of a servo system in one of such servo control apparatuses. In FIG. 6, a servo control apparatus constitutes a feedback system in which a controller C is used and a disturbance d is applied to an input u of a target plant 55, to thereby cause an output y of the target plant 55 to follow a command value Y. In this servo system, the command following performance is improved as a bandwidth (a range in which $|T|\approx 1$) of a complementary sensitivity function $T=C\sim P/(1+C\sim P)$ representing a transfer characteristic of $Y \rightarrow y$ becomes broader, while the disturbance suppressing performance to suppress the disturbance d is improved as a value of $|S|$ in a middle to low frequency range of a sensitivity function $S=1/(1+C\sim P)$ representing a transfer characteristic of $d \rightarrow u$ becomes smaller.

Here, the command following performance may be improved by forming a feedforward system (not illustrated). Meanwhile, when the sensitivity function S in the middle to low frequency range is minimized to improve the disturbance suppressing performance, the bandwidth of the complementary sensitivity function T is inevitably broadened to a high range. This often results in problems such as occurrence of vibrations in a high frequency band and a decrease in system stability. To circumvent such problems, a control method for suppressing only disturbance in a minor loop has been conventionally suggested. As a conventional disturbance suppressing control method, there has been known a control method (hereinafter referred to as a disturbance observer method) of approximating a target plant to a lower order model, estimating a disturbance d input to the target plant, and providing to a control input feedback data for cancelling the disturbance d, to thereby suppress disturbance.

Figure 7:
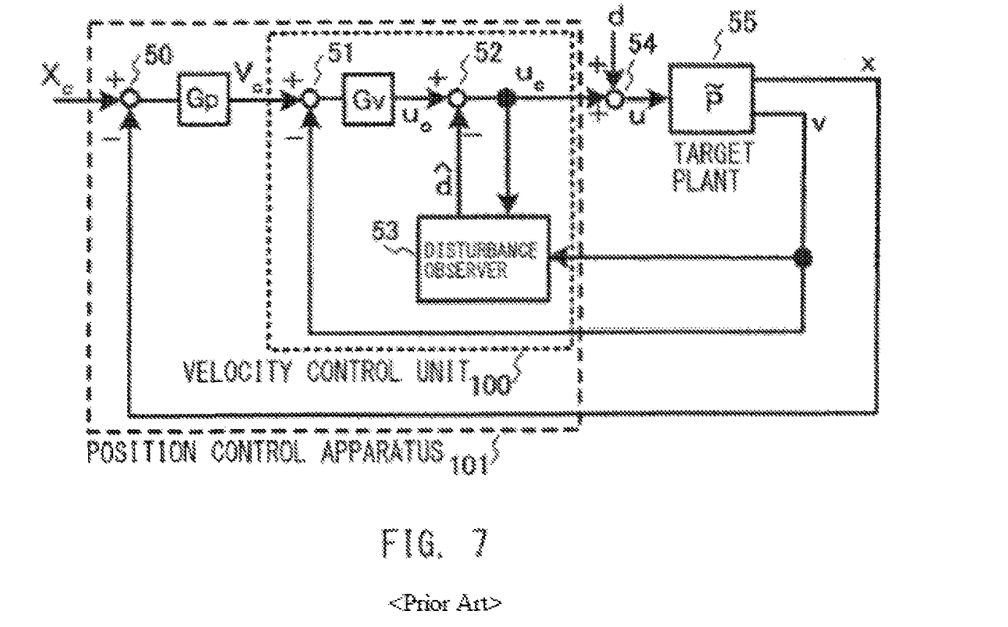
FIG. 7 is a block diagram showing an example of a conventional position control apparatus to which a disturbance observer method is applied.

FIG. 7 is a block diagram showing an example of a conventional position control apparatus to which the disturbance observer method is applied. The target plant 55 is actuated by a drive motor (not illustrated), and a control input u of the target plant 55 receives a signal obtained by adding the disturbance d to a motor generated drive force uc in an adder 54. An output v from the target plant 55 represents a motor velocity detected by a detector (not illustrated) or the like, and another output x from the target plant 55 is composed of a driver position and a motor position detected in a manner similar to that used by the detector. A velocity control unit 100 is a velocity control apparatus for controlling a motor velocity v exactly in accordance with a velocity command value Vc, and is configured to amplify, in a velocity deviation amplifier Gv, a velocity deviation signal obtained by subtracting the motor velocity v from the velocity command value Vc.

A disturbance observer 53 internally stores a lower order model of the target plant 55 and outputs a disturbance estimate value $\hat{d}$ calculated from the motor generated drive force uc and the motor velocity v. A drive force command value u0, which is an output from the velocity deviation amplifier Gv, is passed as the motor generated drive force uc obtained by subtracting the disturbance estimate value $\hat{d}$ from the drive force command value u0 in a subtractor 52. To control a driver position x (or a motor position indirectly indicative of the driver position) exactly in accordance with a position command value Xc, a position control apparatus 101 subtracts the driver position x from the position command value Xc in a subtractor 50 to find a position deviation and amplifies the position deviation in a position deviation amplifier Gp. An amplified output from the position control apparatus 101 is passed as the velocity command value Vc to the velocity control unit 100.

In the conventional position control apparatus to which the disturbance observer method as described above is applied, so long as a transfer characteristic $\sim P$ of the target plant matches a transfer characteristic P of the lower order model stored in the disturbance observer, the disturbance estimate value $\hat{d}$ is obtained as a precise estimate value of the disturbance d, and the disturbance d can be cancelled by feeding back the precise disturbance estimate value $\hat{d}$. In this way, disturbance suppressing performance can be improved without exerting any influence on the command following performance. However, because the transfer characteristic $\sim P$ of the target plant generally does not match the transfer characteristic P of the lower order model, especially in a high frequency band, the disturbance estimate value $\hat{d}$ to be fed back may include data of a sort of unintended state feedback. This often exerts an adverse influence on the command following performance, and results in occurrence of vibrations.

Figure 8:
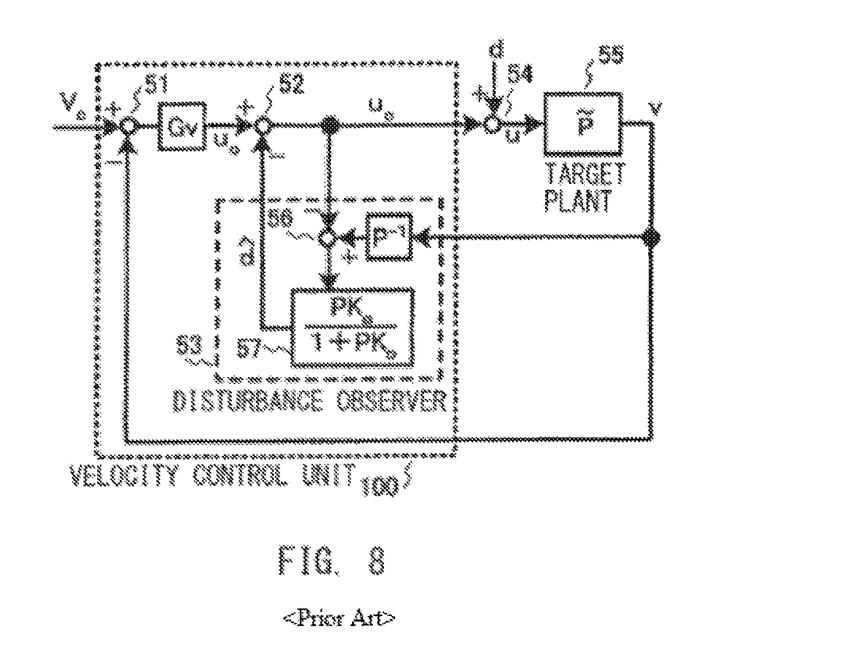
FIG. 8 is a block diagram showing in detail an exemplary configuration of a velocity control unit in FIG. 7.

Referring to FIG. 8, control characteristics associated with the thus-configured conventional position control apparatus are described more specifically. FIG. 8 is a block diagram showing, in detail, an exemplary configuration of a velocity control unit 100. Description of the components explained with reference to FIG. 7 is not repeated below. Here, the transfer characteristic $\sim P$ of the target plant is assumed to be a transfer characteristic from the control input u to the motor velocity v, and defined as a two-inertial system having a transfer pole $\omega p$ and a transfer zero $\omega z$ expressed by equation (1) as follows.

$$\sim P = (s^2 + \omega z^2)/\{I1s(s^2 + 2\zeta\omega p \cdot s + \omega p^2)\} \quad (1)$$

Where I1 represents a drive side moment of inertia, and $\zeta$ represents an attenuation factor. Then, the lower order model stored in the disturbance observer is defined as a one-inertial system, and the transfer characteristic P of the model is defined so as to match the transfer characteristic $\sim P$ of the target plant in a low frequency range by equation (2) as follows.

$$P = 1/(Is) = 1/\{(I1+I2)s\} \quad (2)$$

Where I2 represents a load side moment of inertia, and an equivalent moment of inertia I is equal to (I1+I2).

Operation of outputting the disturbance estimate value ˆd performed by the disturbance observer 53 may be equivalently expressed by an operation of subtracting, in a subtractor 56, the motor generated drive force uc from the motor velocity v multiplied by an inverse transfer characteristic P−1 of the lower-order model, and multiplying a subtracted result by a transfer characteristic K0 in a transfer function block 57. The transfer characteristic K0 in the transfer function block 57, which may be expressed using an observer gain ω0 as K0=I·ω0, serves as a primary low pass filter characteristic in below-described equation (3).

$$PK0/(1+PK0)=(\omega 0/s)/\{1+(\omega 0/s)\}=\omega 0/(s+\omega 0) \tag{3}$$

Figure 9:
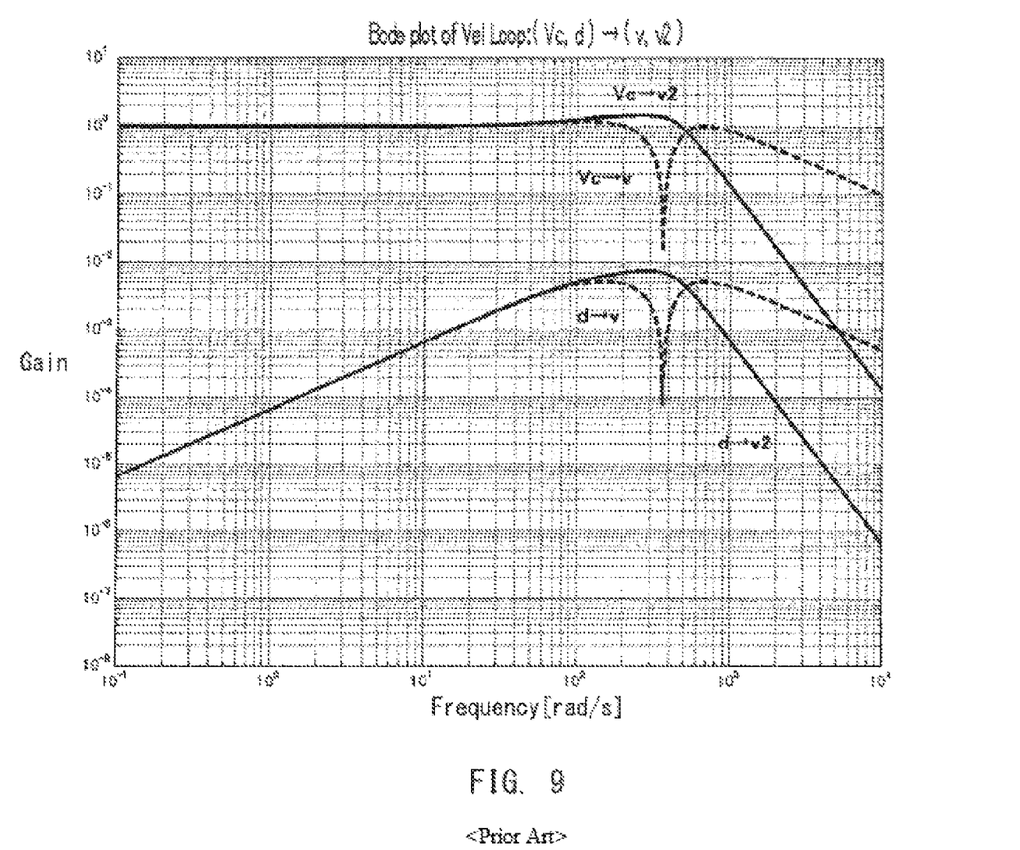
FIG. 9 is a graph showing an example of frequency characteristics of a conventional velocity control unit to which no disturbance observer method is applied.
Figure 10:
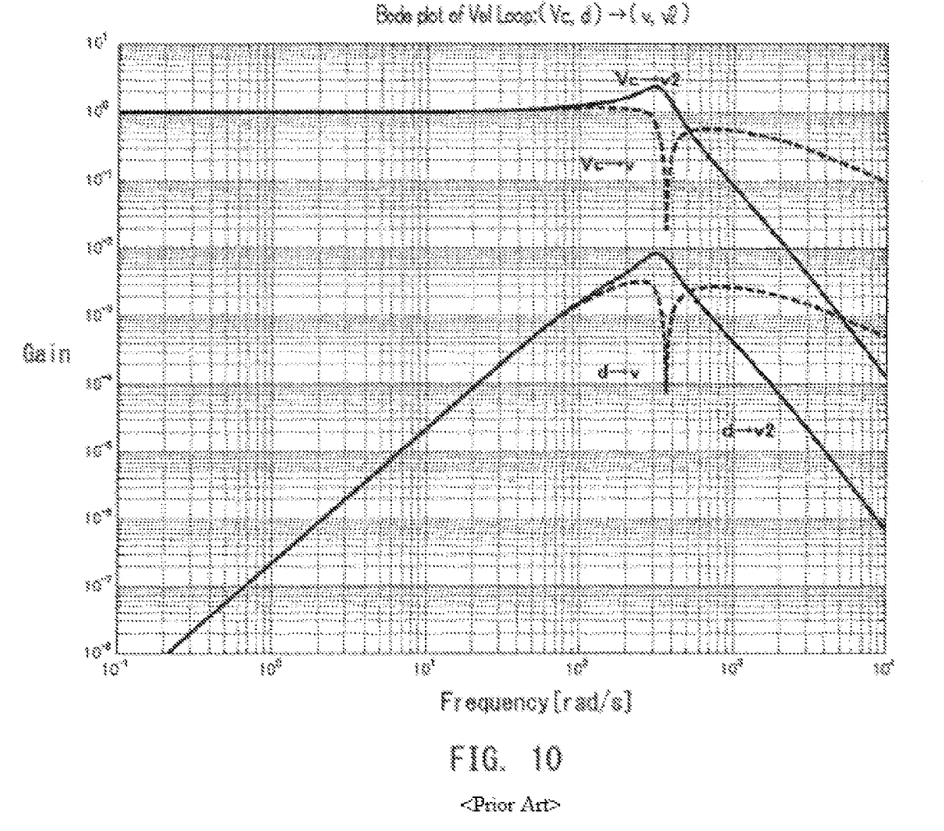
FIG. 10 is a graph showing an example of frequency characteristics of a conventional velocity control unit to which the disturbance observer method is applied.

Here, parameters associated with the transfer characteristic ˜P are set as I1=0.2 [kgm2], I2=0.4 [kgm2], ζ=0.005, ωp=628 [rad/s], and ωz=364 [rad/s], and the velocity deviation amplifier Gv is suitably determined on condition that the disturbance observer method is not applied (ω0=0). Frequency characteristics (Vc, d→v, v2) of the velocity control unit 100 obtained using the above parameters and the velocity deviation amplifier Gv are shown in FIG. 9. It should be noted that v2 represents the load side velocity of the target plant 55 expressed with the two-inertial system, and the velocity deviation amplifier Gv is configured by a generally-used proportional integral compensator. In comparison, FIG. 10 shows the frequency characteristics (Vc, d→v, v2) obtained when the disturbance observer method is employed with the observer gain ω0 selected as ω0=300 [rad/s].

The disturbance suppressing performance represented by the frequency characteristics (d→v, v2) is improved in the middle to low range by applying the disturbance observer method. However, as is evident from FIG. 10, in a frequency band close to the transfer zero ωz where a difference between the transfer characteristic ˜P of the target plant and the transfer characteristic P of the lower order model is maximized, application of the disturbance observer method affects the command following performance represented by the frequency characteristic (Vc→v2) with respect for which a gain is increased, resulting in occurrence of vibrations.

How the command following performance is affected by the disturbance observer method may be understood as described below. Because the transfer characteristic K0 in the transfer function block 57 of FIG. 8 has a dropping characteristic of only −20 dB/dec at maximum as shown in equation (3), the transfer function block 57 is unable to cut off increasing components other than the disturbance contained in an input to the transfer function block 57 in the frequency range where a plant error, which is the difference between the transfer characteristics ˜P and P, is increased.

Figure 11:
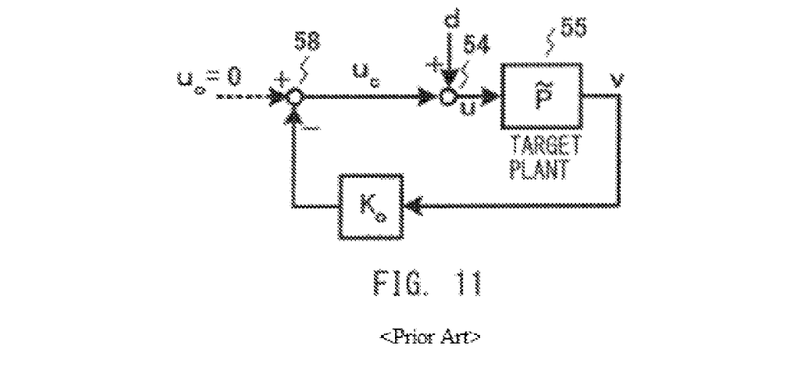
FIG. 11 is a block diagram showing an arrangement obtained by equivalently converting a disturbance suppression unit shown in FIG. 8.

To grasp operation of a disturbance suppressing system in FIG. 8, a disturbance suppressing part is equivalently converted assuming that u0=0. FIG. 11 shows a result of this equivalent conversion. When the transfer characteristic ˜P of the target plant is expressed using a nominal characteristic of the transfer characteristic P and the plant error, the problem of reducing the magnitude of equation (3) with respect to the plant error may be replaced by a robust stability problem. This is used in JP H11-24708 A for designing the transfer characteristic K0 with H$^\infty$ control design (where K0 is an H infinity controller).

Figure 12:
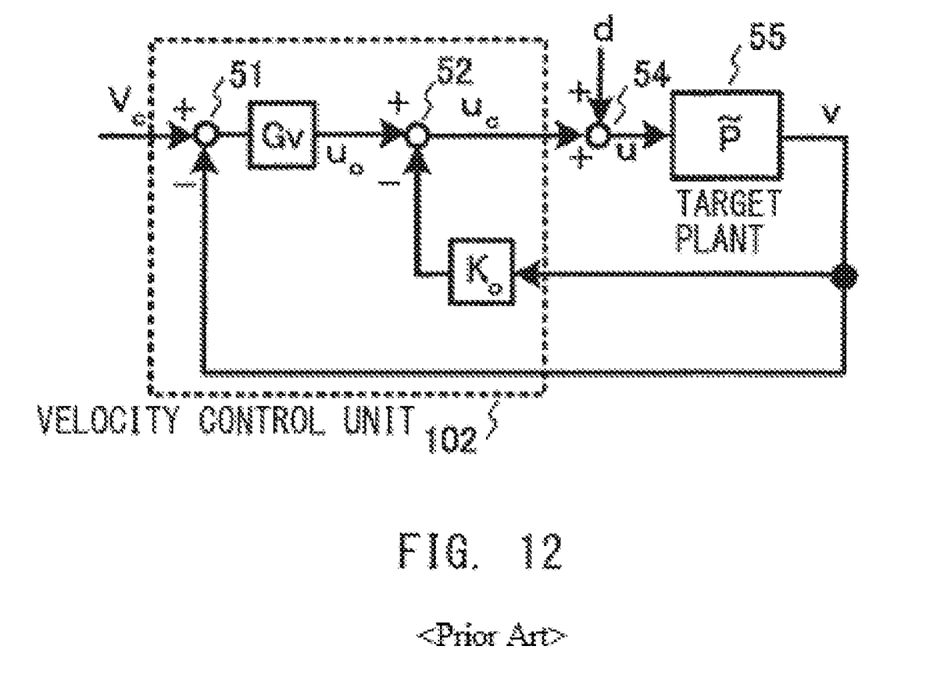
FIG. 12 is a block diagram showing a configuration of a conventional velocity control apparatus.

In JP H11-24708 A, however, a velocity control unit is structured as shown in FIG. 12, which causes a response to the drive force command value u0 to become equivalent to a response to the disturbance d in the disturbance suppressing system. Accordingly, when this disturbance suppressing system is introduced, a command following characteristic undergoes a change in the middle to low range. To prevent the change, the command following performance should not be designed independently of the disturbance suppressing performance, which inevitably involves redesign of the velocity deviation amplifier Gv.

As described above, with the conventional servo control apparatus including the disturbance suppressing system which is formed in the minor loop with the intention of improving disturbance suppressing performance, the disturbance suppressing performance may be improved in the middle to low range, while the disturbance suppressing system affects the command following system and therefore induces vibrations or other adverse influences. Due to these influences, it has been impossible to separately design the command following performance and the disturbance suppressing performance. There is a need for a servo control apparatus including a disturbance suppressing system capable of solely enhancing disturbance suppressing performance in the middle to low range without having an influence on the command following system.

SUMMARY

The present invention satisfies the need by incorporating, into a servo control apparatus, a disturbance suppressing system in which a component contained in an output of a target plant due to a disturbance estimate error is amplified in a disturbance suppressing controller having a frequency characteristic corresponding to the magnitude of a plant error which is a difference in transfer characteristic between the target plant and a plant model, and fed back to a control input.

In the servo control apparatus according to the present invention, a target plant model is used to calculate a disturbance estimate error signal. The disturbance suppressing system is configured to amplify the disturbance estimate error signal to a greater extent in a middle to low frequency range where the plant error is small enough for detecting the disturbance estimate error signal at a high degree of accuracy, and to amplify the disturbance estimate error signal to a lesser extent in a high frequency range where the plant error is great enough to impair the accuracy of detecting the disturbance estimate error signal, and feed the disturbance estimate error signal amplified in either way back to the control input. With the thus-configured disturbance suppressing system, improvement in disturbance suppressing performance in the middle to low range can be solely achieved without exerting an influence on command following performance in the entire frequency range. This has advantageous effects of introducing no vibrations resulting from formation of the disturbance suppressing system in a minor loop, and therefore allowing the disturbance suppressing performance to be designed independently of the command following performance. Further, because all characteristics are prevented from undergoing any change in the high range, it is ensured that stability of a velocity control system and that of a position control system are not impaired.

BRIEF DESCRIPTION OF THE DRAWINGS

The present invention will be further described with reference to the accompanying drawings, wherein like reference numerals refer to like parts in the several views, and wherein.

DESCRIPTION OF THE EMBODIMENT

In the following description, the present invention is described in accordance with an exemplary embodiment with reference to the drawings. In the present invention, a disturbance suppressing system is also formed in a minor loop through which data is fed back to a control input as conventionally achieved. Firstly, a request to form the disturbance suppressing system that does not induce vibrations is replaced, as described above, by a problem of finding a transfer characteristic K0 which allows a feedback amount given to the control input to be reduced in a frequency range where a plant error represented by a difference between transfer characteristics ~P and P becomes greater. Solving this problem can prevent change in command following performance in a high frequency range due to formation of the disturbance suppressing system. Secondly, an equivalent block shown in FIG. 11 as described above is used to consider the disturbance suppressing performance. A request to increase the disturbance suppressing performance in a middle to low frequency range where the plant error is small is replaced by a problem to find the transfer characteristic K0 which allows a transfer characteristic of d→u to be minimized in the middle to low frequency range in FIG. 11.

Figure 2:
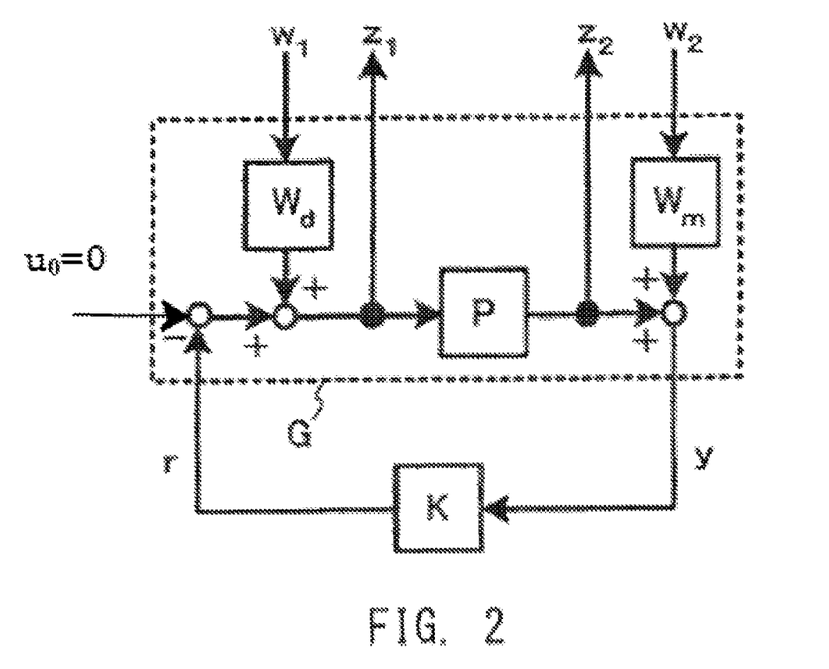
FIG. 2 is a block diagram for explaining a method for designing a disturbance suppressing controller according to the present invention.

FIG. 2 shows a block diagram obtained by incorporating the two problems formulated as a robust control problem into a generalized plant G. In FIG. 2, reference symbol P represents a transfer characteristic of a plant model created by modeling a target plant, and reference symbol K represents a robust controller having a transfer characteristic corresponding to the above-described transfer characteristic K0. The robust controller K is the disturbance suppressing controller of this invention. A process of solving the robust control problem to thereby obtain the disturbance suppressing controller K having the transfer characteristic that satisfies the above-described requests will be described below. It should be noted that M represents a transfer matrix of [w1, w2]T→4 [z1, z2]T, and Mij represents a transfer function for elements of i rows and j columns.

When the plant error is represented as a multiplication variable, a weighted transfer function Wm in FIG. 2 is of a stable minimum phase system including a magnitude of the plant error represented as the multiplication variable on the frequency characteristics, and determined so as to satisfy a relationship expressed by equation (4) as follows.

$$|Wm| > |1 - {}^\sim P/P| \qquad (4)$$

Here, a transfer characteristic M22 for w2→z2 may be expressed by equation (5) as follows.

$$M22 = -Wm \cdot PK/(1+PK) \qquad (5)$$

Because Wm is increased in the high range, a task to design a transfer characteristic K which allows equation (5) to be minimized corresponds to the above-described problem of preventing the command following performance from being changed in the high range.

Next, a transfer function M11 for w1→z1 may be expressed by equation (6) as follows.

$$M11 = Wd \cdot 1/(1+PK) \qquad (6)$$

When the weighted transfer function Wd is selected to be of the stable minimum phase system exhibiting an increase in the middle to low range, a task to design the transfer characteristic K which allows equation (6) to be minimized corresponds to the problem of improving the disturbance suppressing performance in the middle to low range.

Because, as has already been described above, the problem in which the above-described two requests are formulated is incorporated in the transfer matrix M, the disturbance suppressing controller K which will be a common solution is obtained by solving the robust control problem. Below-described equation (7) represents the structure of the transfer matrix M including non-diagonal elements.

[Expression 1]

$$M = \begin{bmatrix} W_d \dfrac{1}{1+PK} & -W_m \dfrac{K}{1+PK} \\ W_d \dfrac{P}{1+PK} & -W_m \dfrac{PK}{1+PK} \end{bmatrix} \qquad (7)$$

In a process of solving the robust control problem, because the non-diagonal elements in equation (7) are not involved in formulation of the requests, it is undesirable that the non-diagonal elements gives a constraint to design of the disturbance suppressing controller K. Accordingly, in this invention the robust control problem is solved with p design, so that the non-diagonal elements are multiplied by a scaling factor to minimize the constraint placed on the design.

Below-described equation (8) shows the structure of the weighted transfer function Wm used in this embodiment and determined so as to cover $|1 - {}^\sim P/P|$ on the frequency characteristics.

[Expression 2]

$$W_m = \left( k \dfrac{s^2 + 2\zeta_b \omega_b s + \omega_b^2}{s^2 + 2\zeta_a \omega_a s + \omega_a^2} \right)^2 \qquad (8)$$

Where Wm is of a high pass type, and +80 dB/sec is selected for a transition characteristic.

Similarly, equation (9) described below shows the structure of the weighted transfer function Wd determined so as to be increased in the middle to low range.

[Expression 3]

$$W_d = \frac{s^2 + 2\zeta_f \omega_f s + \omega_f^2}{s^2 + 2\zeta_e \omega_e s + \omega_e^2} \quad (9)$$

Where Wd is of a low pass type, and −40 dB/dec is selected for the transition characteristic.

Figure 3:
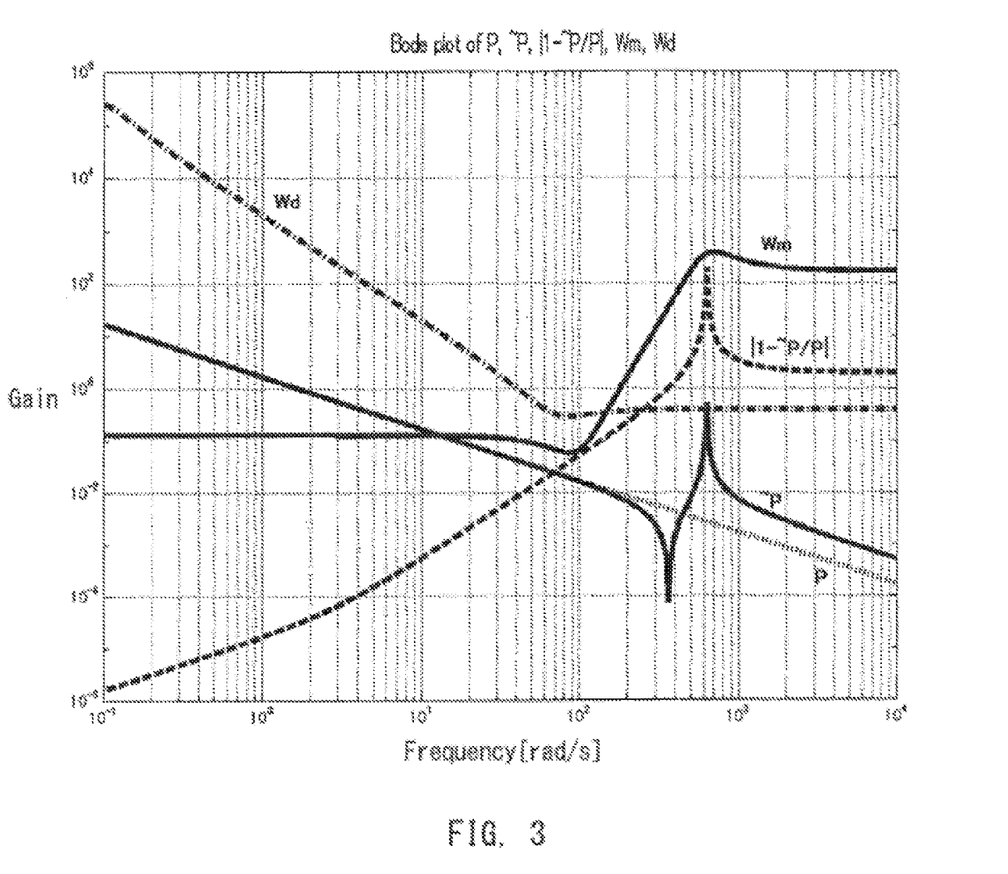
FIG. 3 is a graph showing an example of frequency characteristics for each block in FIG. 2.

FIG. 3 shows frequency-gain characteristics of the above-described transfer characteristics ~P and P, |1−~P/P|, and the transfer functions Wm and Wd obtained using parameters (k, ζa, ζb, ζe, ζf, ωa, ωb, ωe, ωf) determined through a trial and error process for the target plant 55 having the transfer characteristic ~P expressed by equation (1) (where I1=0.2 [kgm2], I2=0.4 [kgm2], ζ=0.005, ωp=628 [rad/s], and ωz=364 [rad/s]) which is used for explaining the background art. It should be noted that the transfer characteristic P of the plant model is also determined by setting the lower order model having the transfer characteristic of equation (2) used for explaining the background art.

Figure 4:
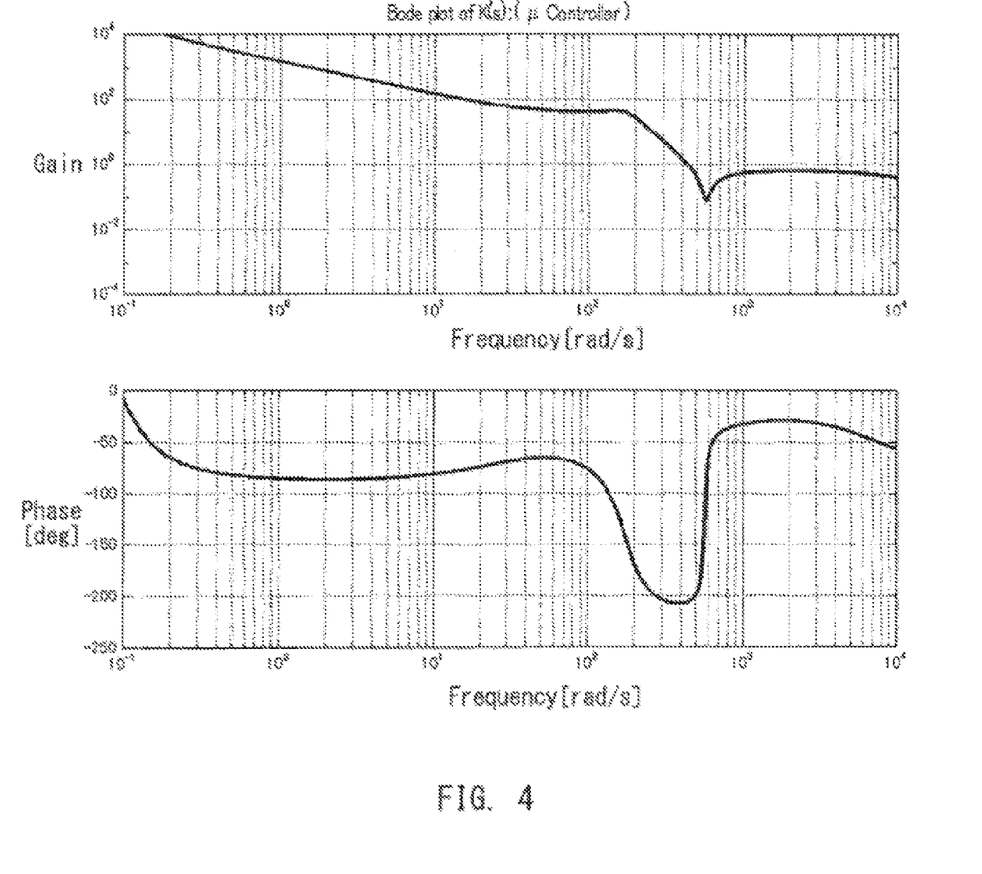
FIG. 4 is a graph showing an example of frequency characteristics of the disturbance suppressing controller according to this invention.

The frequency characteristic of the disturbance suppressing controller K designed under the above-described condition is shown in FIG. 4. Because, in the transfer characteristic M11 defined by equation (6), −40 dB/dec is selected for the transition characteristic of the weighted transfer function Wd in the middle to low range, $H^\infty$ norm of the transfer characteristic M11 is reduced when the disturbance suppressing controller K has the transition characteristic of −20 dB/dec in the middle to low range. On the other hand, in the transfer characteristic M22 defined by equation (5), +80 dB/dec is selected for the transition characteristic of the weighted transfer function Wm associated with a region close to the transfer zero ωz of the target plant, and $H^\infty$ norm of the transfer characteristic M22 is reduced when the disturbance suppressing controller K has a steep dropping characteristic in that region.

Figure 1:
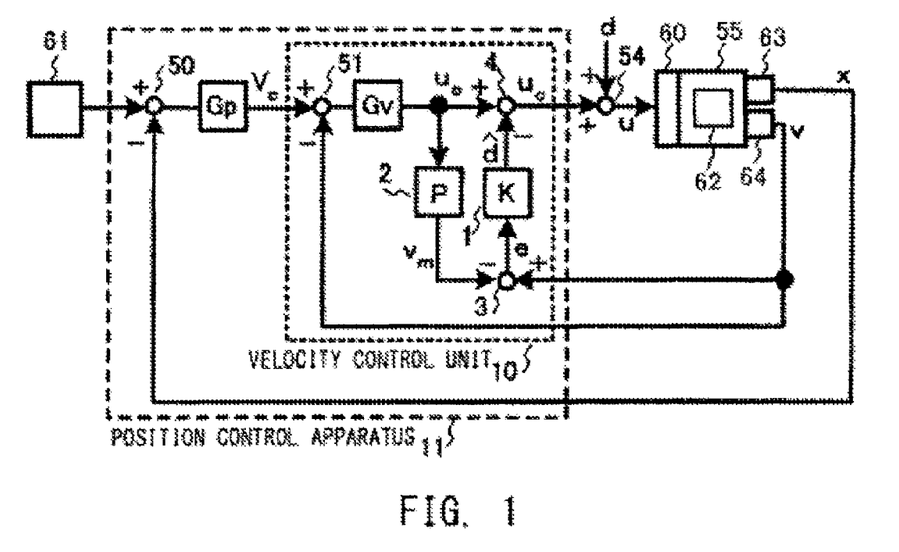
FIG. 1 is a block diagram showing a configuration of a position control apparatus according to an embodiment of the present invention.

FIG. 1 is a block diagram showing an example of a position control apparatus which is the servo control apparatus for driving a servo motor 60 of target plant 55 in accordance with a position command value or a velocity command value issued from a host device 61 according to the present invention. The target plant 55 includes a position detector 63 and a velocity detector 64, and further includes a driver 62 driven by the servo motor 60. Components different from those in the above-described conventional position control apparatus are explained below. The position control apparatus 11 is internally equipped with a velocity control unit 10 constituting the disturbance suppressing system in which the disturbance suppressing controller K (indicated by reference numeral 1) of this invention is included in the minor loop. The plant model 2 has the transfer function P modeled with respect for the target plant, receives as an input the drive force command value u0, and outputs a model velocity vm. A subtractor 3 subtracts the model velocity vm from the motor velocity v, and outputs a subtracted result which is the above-described disturbance estimate error signal e. Therefore, the subtractor 3 functions as the disturbance estimate error calculator for calculating the disturbance estimate error signal. The disturbance estimate error signal e is an input to the disturbance suppressing controller K from which the disturbance estimate value ^d according to this invention is output. The output disturbance estimate value ^d is subtracted from the drive force command value u0 in a subtractor 4 and passed as the motor generated drive force uc.

Here, the disturbance estimate error signal e is expressed by equation (10) as follows.

[Expression 4]

$$e = \tilde{P}\{u_o + (d-\hat{d})\} P u_o = \tilde{P}(d-\hat{d}) + (\tilde{P} - P) u_o \quad (10)$$

From definition of a disturbance estimate error (d−^d), it is found that the disturbance estimate error signal e includes a disturbance estimate error with a high degree of accuracy in the middle to low range where the plant error is small, but includes the disturbance estimate error, which is not obtained with a high degree of accuracy, in the high range where the plant error is great. Accordingly, the disturbance suppressing system of this invention has a control structure in which the feedback amount given to the control input is increased as the degree of accuracy in detection of the disturbance estimate error becomes higher.

Then, the transfer characteristic of u0, d→u in the disturbance suppressing system is expressed by equation (11) as follows.

[Expression 5]

$$u = \frac{1+PK}{1+\tilde{P}K} u_o + \frac{1}{1+\tilde{P}K} d \quad (11)$$

Because the disturbance suppressing controller K is an amplifier that performs amplification using a higher amplification rate in the middle to low range where the plant error is smaller and using a lower amplification rate in the high range where the plant error is great, a superior disturbance suppressing effect is obtained in the middle to low range, so that the influence exerted by the disturbance d onto the control input u is accordingly mitigated. From equation (11), it is confirmed that because the control input u is obtained as u≈u0 when d=0 in the entire range, the command following system is not affected by the disturbance suppressing system.

Figure 5:
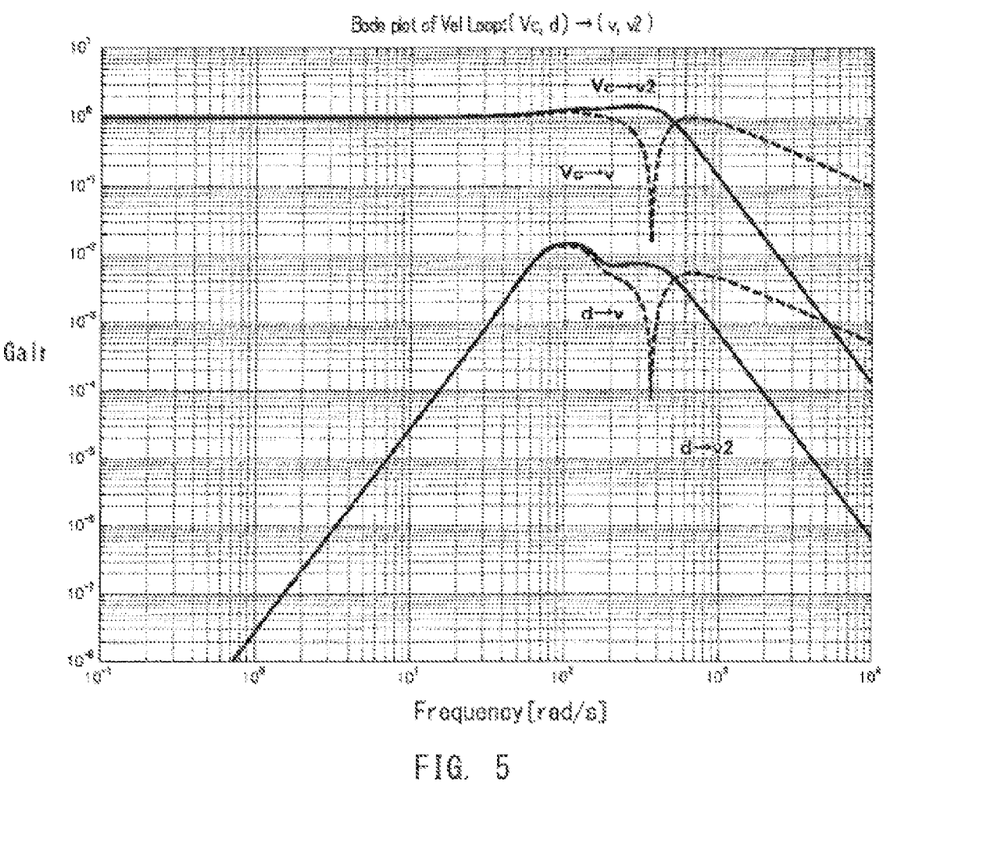
FIG. 5 is a graph showing an example of frequency characteristics of a velocity control unit in the position control apparatus of FIG. 1.

FIG. 5 shows frequency characteristics (Vc, d→v, v2) of the velocity control unit 10 shown in FIG. 1. Here, the velocity deviation amplifier Gv is defined to have the same characteristics as those used for obtaining the frequency characteristics shown in FIGS. 9 and 10 described above. The frequency characteristics (Vc→v, v2) indicative of the command following performance of FIG. 5 are similar to those conventionally obtained as shown in FIG. 9 under the condition that the disturbance observer method is not employed. That is, unlike conventional characteristics shown in FIG. 10 and obtained using the disturbance observer method, the command following performance in FIG. 5 causes no vibrations resulting from an increased gain. Meanwhile, the frequency characteristics (d→v, v2) indicative of the disturbance suppressing performance are understood as described below. The frequency characteristic (d→v) in the middle to low range can be expressed by equation (12) as follows.

[Expression 6]

$$v = \frac{\tilde{P}}{(1+\tilde{P}K) + Gv\tilde{P}(1+PK)} d \approx \frac{1}{GvPK} d \quad (12)$$

Because the disturbance suppressing controller K has the transition characteristic of −20 dB/dec in the middle to low range, the transition characteristics of the frequency characteristics (d→v, v2) in the middle to low range become steeper than those of conventional characteristics in FIG. 10 obtained using the disturbance observer method. From equation (12) and the steeper transition characteristic, the disturbance suppressing performance is proved to be improved. Further, in the middle to low range in which v≈v2, the frequency characteristic (d→v2) is substantially identical with the frequency characteristic (d→v).

As has been described above, the servo control apparatus according to the present invention has the structure including the disturbance suppressing system capable of solely enhancing the disturbance suppressing performance in the middle to low range without having any influence on the command following performance in the entire frequency domain. Because the structure can prevent any change in the frequency characteristics from occurring in the high range due to inclusion of the disturbance suppressing system, it is possible to separately design the command following performance and the disturbance suppressing performance without impairing stabilities of the velocity control system and the position control system.

What is claimed is:

1. A servo control system comprising:
   a target plant having a driver which is driven by a drive motor,
   a velocity detector that detects a velocity of the drive motor as a motor velocity (v);
   a position detector that detects a position of the drive motor or the driver as a driver position (x); and
   a position control apparatus that controls a position or a velocity of the target plant according to a position command value (Xc) commanded from a host device, wherein
   the position control apparatus is configured to:
   amplify a position deviation signal in which the driver position (x) detected by the position detector is subtracted from the position command value (Xc), to calculate a velocity command value (Vc);
   amplify a velocity deviation signal in which the motor velocity (v) detected by the velocity detector is subtracted from the velocity command value (Vc), to calculate a motor generated drive force ($u_O$);
   subtract
   a disturbance estimate value (^d) from the motor generated drive force ($u_O$), to calculate a corrected motor generated drive force ($u_c$);
   input the motor generated drive force ($u_O$) to a plant model equation in which the target plant is approximated by a lower-order model, to calculate a model velocity (vm);
   subtract the model velocity (vm) from the motor velocity (v), to calculate a disturbance estimate error signal (e);
   amplify the disturbance estimate error signal (e), to calculate the disturbance estimate value (^d); and
   output a control signal of the drive motor so that the corrected motor generated drive force ($u_c$) is generated, wherein
   an approximation error of the plant model equation with respect to the target plant in middle and low range frequency regions is smaller than an approximation error of the plant model equation with respect to the target plant in a high range frequency region, and
   a rate of amplification of the disturbance estimate error signal (e) in the middle and low range frequency regions is larger than a rate of amplification of the disturbance estimate error signal (e) in the high range frequency region.

* * * * *